United States Patent
Chen

Patent Number: 6,045,089
Date of Patent: Apr. 4, 2000

[54] SOLAR-POWERED AIRPLANE

[76] Inventor: Franklin Y. K. Chen, One Meadow Glen Rd., Northport, N.Y. 11768

[21] Appl. No.: 09/415,174

[22] Filed: Oct. 8, 1999

Related U.S. Application Data

[62] Division of application No. 09/069,655, Apr. 28, 1998, which is a continuation of application No. 08/480,883, Jun. 7, 1995, Pat. No. 5,762,298, which is a continuation of application No. 07/675,880, Mar. 27, 1991, abandoned.

[51] Int. Cl.[7] .............................. B64C 15/00; B64C 1/00; B64C 75/34
[52] U.S. Cl. ......................... 244/12.1; 244/13; 244/1 R; 244/53 R
[58] Field of Search .................................. 244/1 R, 53 R, 244/58, 45 R, 158 R, 12.1, 13; D12/331

[56] References Cited

U.S. PATENT DOCUMENTS

| | | | |
|---|---|---|---|
| D. 304,924 | 12/1989 | Rosenthal | D12/331 |
| D. 304,925 | 12/1989 | Rosenthal | D12/331 |
| 4,305,555 | 12/1981 | Davis | 244/158 R |
| 4,368,415 | 1/1983 | Henderson et al. | 244/158 R |
| 4,415,133 | 11/1983 | Phillips | 244/53 R |
| 4,768,738 | 9/1988 | Weinert | 244/53 R |
| 4,955,562 | 9/1990 | Martin et al. | 244/1 R |
| 5,503,350 | 4/1996 | Foote | 244/1 R |

*Primary Examiner*—Peter M. Poon
*Assistant Examiner*—Charles R. Ducker, Jr.
*Attorney, Agent, or Firm*—Donald S. Dowden; Cooper & Dunham LLP

[57] ABSTRACT

A Satellite Weather Modification System (SWMS) uses earth satellites to harness solar energy to modify the thermodynamics and composition of the earth's atmosphere. SWMS has three subsystems: The first subsystem includes a network of earth satellites called Satellite Engines (SEs) used to reflect solar energy and/or transform solar energy into other forms of energy beams discharged at specified locations. The media at these locations and the media through which the energy beams pass absorb these energies and change them into heat. The second subsystem includes a large network of Remote Sensing Devices (RSDs). These sensors are used to measure local media compositions, dynamic parameters and thermodynamic properties. Sensor measurements are fed back to the third subsystem, which includes a network of Ground Control Stations (GCSs). GCSs provide energy beam guidance by estimating each beam's characteristics and its aim point trajectory as functions of time. Integration of these three subsystems establishes a sensor feedback energy beam guidance and control loop. SWMS's weather modification applications include alteration of precipitation, reclaiming of wasteland, reducing damage by bad weather, and improving environment. Its non-weather related applications include supplying concentrated energy to electricity generating stations (solar, wind and hydro), high latitude greenhouse farms, and solar powered airplanes.

15 Claims, 7 Drawing Sheets

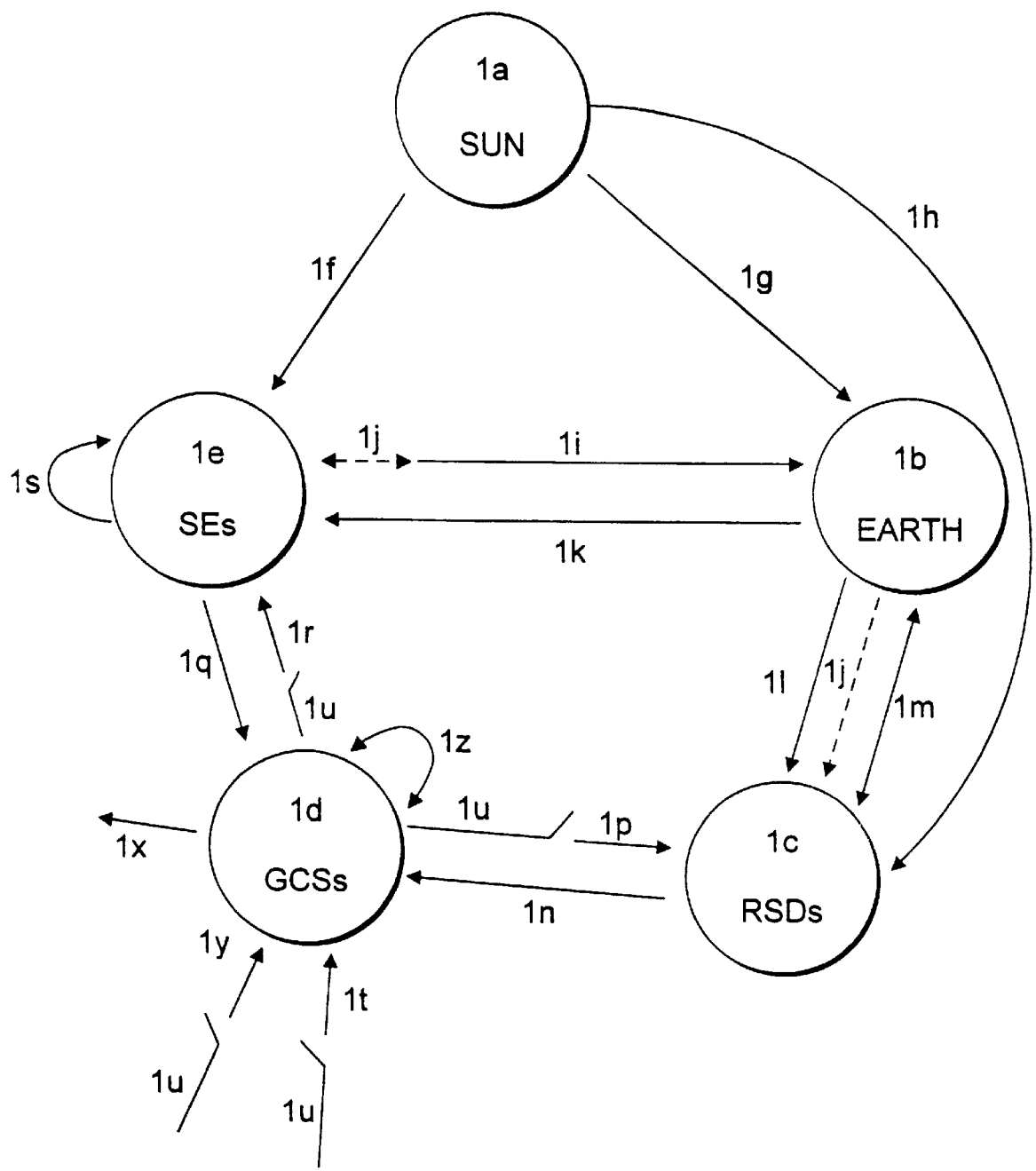
F I G. 1

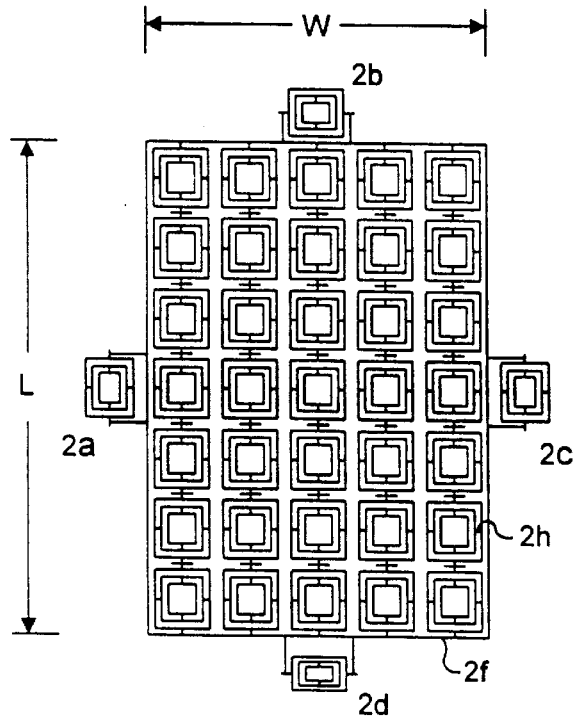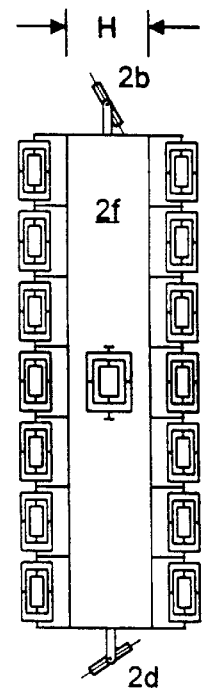
FIG. 2A        FIG. 2B
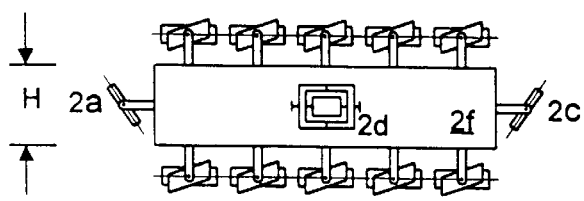
FIG. 2C
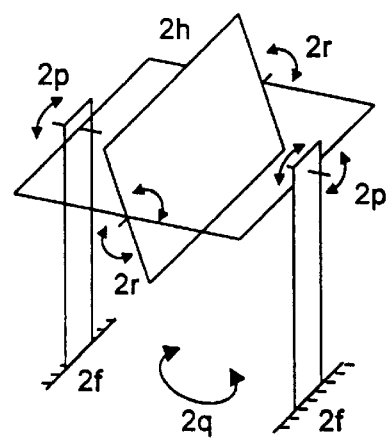
FIG. 2D

SOLAR-POWERED AIRPLANE

This is a division of prior application Ser. No. 09/069,655 filed Apr. 28, 1998, now allowed, which is a continuation of application Ser. No. 08/480,883 filed Jun. 7, 1995, now U.S. Pat. No. 5,762,298, which is a continuation of application Ser. No. 07/675,880 filed Mar. 27, 1991, now abandoned.

BACKGROUND OF THE INVENTION

1. Field of the Invention

This invention relates to solar-based weather modification and energy transfer in such a manner as to improve people's living standards by reducing their energy cost and food cost and simultaneously improving the environment.

2. Description of the Prior Art

Art prior to the present application includes the following:

U.S. Pat. No. 4,402,480 Title: Atmosphere Modification Satellite Inventor: D. M. Udell, Sep. 6, 1983

U.S. Pat. No. 3,613,992 Title: Weather Modification Method Inventor: R. J. Knollenberg, Oct. 19, 1971

U.S. Pat. No. 4,371,135 Title: Solar Array Spacecraft Reflector Inventor: J. E. Keigler, Feb. 1, 1983

U.S. Pat. No. 4,305,555 Title: Solar Energy System with Relay Satellite Inventor: C. E. Davis, Dec. 15, 1981

In addition, the following publications are of interest:

Astronautical Guidance by R. H. Battin, McGraw-Hill Book Co. 1964

Introduction to Radar Systems by M. I. Skolnik, McGraw-Hill Book Co. 1962 and

Radar and the Atmosphere by A. J. Bogush, Jr., Artech House 1989.

In contrast to much of the prior art, this invention employs only solar energy, earth satellites, remote sensing devices and ground control computers. No dispensing of chemicals is needed. The Satellite Weather Modification System (SWMs) is a local as well as a global weather modification tool. For example, SWMS can simultaneously bring rain to dry regions in southern California and drought regions in southern Ethiopia within in a few orbital periods of the Satellite Engines. Most remarkable of all is that these and many other tasks can all be accomplished by switching between some computer codes.

This invention is based on the realization that natural weather patterns always leave opportunities to permit regional weather modifications which are within the capabilities of the proposed Satellite Weather Modification System (SWMS). A fully developed SWMS has the potential to provide the following benefits.

1. Modify cooling, warming, or precipitations of selected regions of earth, thus modifying local and/or global weather patterns.
2. Create and maintain grass or forest lands to balance the rise of carbon dioxide contained in the earth's atmosphere, thus reducing the threat of global warming.
3. Transform some wasteland into productive farmland.
4. Increase farm, fishery and forestry productions at higher latitudes.
5. Increase electricity production on land directly from concentrated solar energy.
6. Increase hydroelectricity production by inducing precipitation in regions upstream of hydroelectric dams.
7. Reduce home and industry energy cost.
8. Reduce environmental damage by harsh weather.
9. Reduce damage to the environment due to the use of fossil fuel and nuclear fuel.
10. Create a unique self-supporting business based on SWMS, which can provide both weather-related and non-weather related services.

SWMS can be implemented employing components which are currently available, including means for reflecting solar rays or discharging infrared radiation or laser beams or incandescent lights.

SWMS improvements can be augmented gradually, still using conventional components, to include discharging frequency agile and or intensity agile energy beams or pulse trains from Satellite Engines (SEs). Each frequency agile energy pulse is designed to penetrate a specified air mass layer of specified composition. For example, these energy pulses can be used to modify a specified air mass inside a thick cloud.

SUMMARY OF THE INVENTION

This invention is an aerospace system designed to harness solar energy to modify the earth's weather. This system is called Satellite Weather Modification System (SWMS). This invention disclosure covers three areas. A first area involves the design and/or integration of three SWMS key subsystems. A second area involves specifying basic SWMS weather modification techniques. A third area involves the design of unique SWMS applications into self supporting businesses.

The first area of this invention disclosure covers the three SWMS key subsystems. They are:

1. Satellite Engines (SEs): The basic function of an SE is to reflect solar energy or to transform solar energy into another form of energy before discharging it to a specified location. Each SE is a specially designed earth satellite. In a mature SWMS, many millions of SEs will be operating in a coordinated manner. As a minimum capability, each SE will be designed to reflect solar energy and simultaneously convert solar energy into electricity via solar cells. Advanced SE models will be capable of transforming solar energy into energy beams of different frequencies before discharging them. These advanced SEs can simultaneously discharge solar energy, frequency agile and intensity agile MMW (millimeter wave) or RF or microwave pulse trains, infrared radiations, laser light and incandescent light as the mission may require. All physical characteristics of each energy beam (solar or otherwise) are adaptively estimated by Ground Control Stations (GCSs). GCS also estimates each energy beam's guidance by defining its desired aim point trajectory. The criteria used to select and to guide each energy beam are based on an estimated specific thermodynamic change taking place in a specific air mass that satisfies some required weather condition changes.

Each SE will have gimbals panels (i.e., panels mounted on gimbals) on its outer surfaces. Each gimbals panel has a reflector on one side and solar cells on the other side. Also, gimbals-mounted antennae and lamps are attached to the SE structure frame. The SE controls the direction of each energy beam by controlling each panel's two gimbals orientations with respect to the SE structure frame. By using flywheels (or other methods), each SE also controls its structure frame orientation with respect to inertial space.

A minimum SWMS configuration requires that all SEs be placed in two non-coplanar orbits. These orbits are slightly inclined with respect to each other. One orbit will always be higher than the other orbit. Each SE structure frame will maintain an average angular rate of one revolution per year with respect to inertial space. During each orbit around the earth an SE will experience two different operating modes, depending on whether the SE is inside or outside earth's shadow. These modes are described below:

When SEs are outside earth's shadow, SEs in the higher orbit will rotate their solar cell panels (on one SE side) facing the general direction of the sun. At the same time SEs will rotate their reflector panels (on the other side of the SE) facing away from the sun. SEs in the lower orbits will have their reflector panels (on one SE side) facing the general direction of the sun and their solar cell panels (on the other side of the SE) facing away from the sun. This arrangement allows the solar rays first reflecting from the lower orbit SEs' reflectors to the reflectors on the higher orbit SEs, before finally re-reflecting these solar rays to earth (in FIG. 3 see incoming solar rays 3a, rays 3b reflected from the lower orbit to the higher orbit, and rays 3c reflected from the higher orbit into the earth's atmosphere).

When SEs are inside earth's shadow, SEs will rotate their reflector panels to face the reflector panels in the other orbit. This arrangement allows the solar rays to travel between the two orbits inside earth's shadow before discharge to earth (see rays 3z in FIG. 3).

2. Remote Sensing Devices (RSDs): The basic functions of RSDs are to continuously measure the actual atmospheric conditions of each specified weather cell. Ideally, there will be billions of RSDs of every kind distributed over the globe. These RSDs are used to continuously monitor the actual thermodynamics, dynamics, compositions and other physical conditions of the atmosphere, land and water surfaces, subsurfaces, sun and Satellite Engines. There will be different kinds of RSDs measuring different parameters. Some RSDs will be stationary on earth. Other RSDs may be located on Solar Powered Satellite Airplanes (SPSAs), on balloons or on SEs. All RSD measurements are time and location tagged before transmitting to their respective local Ground Control Stations (GCSs) for data correlation and analysis. Some measurements are sent directly to or measured directly by SEs.

3. Ground Control Stations (GCSs): The basic function of GCSs is to provide guidance to each SE. This includes defining the characteristic of each energy beam and its aim point trajectory as functions of time. Each GCS includes a network of supercomputers, special algorithms, mathematical models, monitors, control panels, data storage devices, electronic libraries, data transmitters and data receivers. The main tasks of each GCS are: To maintain detailed information about local weather conditions, to integrate raw local RDSs measurements with filtered information about weather conditions of other locations (received from other GCSs), to extrapolate weather conditions to future time points, to monitor assigned Satellite Engines' (SEs') status, to evaluate assigned SEs' performances, to identify potential local weather patterns which can be modified by SWMS, to estimate potential weather modification options, to evaluate desired weather condition requests, to select optimal SEs groupings, to estimate SEs weather modification tasks options, to coordinate all SEs tasks, to assign and transmit detailed weather modification tasks to each assigned SE (i.e., specify energy beam's characteristic and its aim point trajectory as functions of time), to maintain communication between GCSs, RSDs and SEs, and, finally, to accept human inputs and controls.

The second area of this invention disclosure involves specifying SWMS weather modification techniques. This includes: Cooling the earth by reflecting solar rays back into deep space, warming local regions by redirecting solar rays to local areas, creating clouds by warming local wet surfaces and modifying local air mass velocity components by controlled heating of specific air masses to create pressure differentials.

The third area of this invention disclosure involves organizing SWMS unique services into self supporting business ventures. The SWMS services include: Weather modifications (cooling, warming, altering precipitations, altering air sass velocity components), supply of energy (direct solar power, indirect wind or hydroelectric power or solar powered airplane) and environment improvements (reclaiming wasteland, creating greenhouse farms, reducing bad weather damages, reducing fossil and nuclear fuels usage). Included in SWMS applications is an invention of a Solar Powered Satellite Airplane (SPSA). SPSA comprises a hinged zero lift solar cell disk supported by two wings as shown in FIG. 4. These SPSAs can serve as global communication platforms.

BRIEF DESCRIPTION OF THE DRAWINGS

FIG. 1 Satellite Weather Modification System (SWMS) key subsystems Functional Flow Overview.

FIG. 2. External Features of A Typical Satellite Engine (SE). FIG. 2. consists of FIG. 2A (top view), FIG. 2B (right side view), FIG. 2C (front view), and FIG. 2D, showing a typical panel or antenna gimbal rings arrangement.

FIG. 4 consists of FIG. 4A, which is a sectional view taken along any of the section lines 4A—4A in FIG. 4C and looking in the direction of the arrows; 4B, which is a front view; 4C, which is a top view; and 4D, which is a side view.

Figure 3:
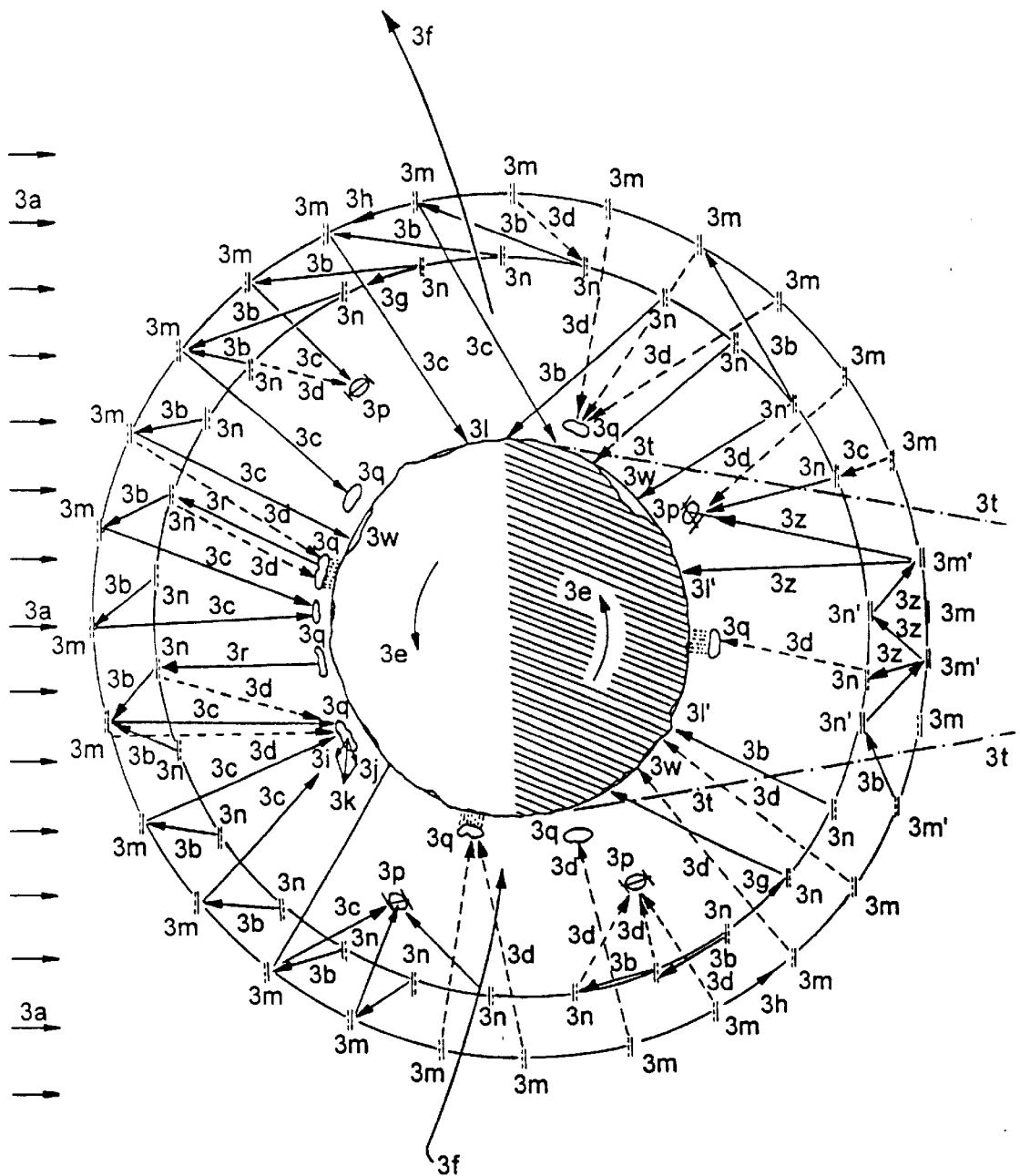
FIG. 3. Satellite Engines (SEs) Orbital Operations Overview.

Detailed descriptions of these figures are presented below. Important items in each figure are identified in the text by a bold faced number representing the figure number. It is then followed by a fold faced lower case letter to identify the item in the figure. Example: 4d identifies item labeled 4d in FIG. 4.

DETAILED DESCRIPTION OF THE PREFERRED EMBODIMENTS

While there are shown and described the preferred embodiments of the invention, it is to be distinctly understood that the invention is not limited thereto, but may be otherwise variously embodied and practiced within the scope of the appended claims.

To facilitate an understanding of the invention, a number of features are identified herein by letter(s) and a number inside a bold square bracket, as: [letters/number] or [letter-number/number]. Letter(s) or letter-number before a/0 identify major features of the invention. Each non-zero number following the/represents a feature that, while important, is less important than the major features. The major features are:

| | |
|---|---|
| [SWMS/0] = | Features relating to Satellite Weather Modification System (SWMS) designs. |
| [SE/0] = | Features relating to Satellite Engine (SE) designs. |
| [OP/0] = | Features relating to SEs operations. |
| [RSD/0] = | Features relating to Remote Sensing Devices (RSDs) integration. |
| [GCS/0] = | Features relating to Ground Control Stations (GCSs) designs. |
| [C/0] = | Features relating to control energy beam directions. |
| [F/0] = | Features relating to Frequency Agile and Intensity Agile energy beams' selections. |
| [W#/0] = | Features relating to SWMS basic weather modification techniques (# = 1, 2, 3, 4). |
| [A#/0] = | Features relating to SWMS weather modification applications and non-weather related applications (# = 1, 2, 3, 4, 5, 6) |

A stand-alone bold faced number followed by a bold faced lower case letter refers to a correspondingly labeled item in the figure identified by the bold faced number. Example: 3c represents an item identified by 3c in FIG. 3.

V.1 [SWMS/#]: FEATURES RELATING TO SATELLITE WEATHER MODIFICATION SYSTEM (SWMS) DESIGN. A major feature [SWMS/0] is covered in this section. Five additional features [SWMS/1], ..., [SWMS/5] are covered in separate paragraphs.

An elaboration of the features is set out below:

[SWMS/1]: The invention employs satellites to harness the solar energy and use this energy to modify selected local weather conditions and/or supply power to various non-weather related applications.

[SWMS/2]: The SWMS modified local weather conditions are, under certain situations, used to modify global weather conditions.

[SWMS/3]: This Satellite Weather Modification System (SWMS) includes the following three key subsystems:

Satellite Engines (SEs) 1e.

Remote Sensing Devices (RSDs) 1c.

Ground Control Stations (GCSS) 1d.

[SWMS/4]: Most SEs are in earth orbits, but some SEs can be installed on land, or airplanes or on ships.

[SWMS/5]: In an SWMS the energy and information flow between sun 1a, earth 1b, RSDs 1c, GCSs 1d and SEs 1e, as represented in FIG. 1, are identified and listed below:

1f Solar energy from the sun to the SEs.

1g Solar energy from the sun to earth.

1h Solar activities, such as sun spots, which can affect earth's weather and which are measurable by instruments.

1i Reflected solar energy beams and/or frequency agile energy beams discharged from SEs to earth surface or into the atmosphere or to deep space or to Solar Powered Satellite Airplanes.

1j Coded solar or frequency agile energy beams reflected back to SEs instruments or to RSDs instruments.

1s Solar energy beams or frequency agile energy beams from one SE to another SE.

1k Solar energy or frequency agile energy reflected back to SEs' reflector panels or the SEs' solar cell panels.

1l Energy or signals from earth or from atmosphere received by passive RSDs.

1m Signals transmitted and received by active RDSs.

1n Time and space tagged measurement data transmitted from RSDs to GCSs at regular intervals.

1p Command and control messages from GCSs to RSDs.

1q Status reports from SEs to GCSs at regular intervals.

1r Time tagged detailed assignments (each energy beam's characteristics and its AAP (Adjusted Aim Point) trajectory) for each SE from GCSs at regular intervals.

1t Desired local and global weather condition requests.

1x Data and status display to off-line devices.

1y Off-line analysis to update GCS math models, algorithms, operations and library data base.

1z Data flow between GCSs. Each GCS takes its turn to coordinate the activities of all GCSs.

1u Human (manual) controls.

V.2 [SE/#]: FEATURES RELATING TO SATELLITE ENGINE (SE) DESIGN. A major feature [SE/0] is covered in this section. Six additional features [SE/1], ..., [SE/6] are covered in separate paragraphs.

[SE/1]: SEs can have any shape. In this description it is assumed that the basic structure frame of each Satellite Engine (SE) has an outer contour resembling a flat rectangular box of dimension L(Length)×W(Width)×H(Height), where H is the smallest dimension. All six outside surfaces of this flat box are either fully or partially covered with reflecting materials.

[SE/2]: On top of each L×W surface is an array of n×m panels.

[SE/3]: One side of each n×m panel is made of a reflecting material. It is used to reflect solar rays or laser lights. The other side of each n×m panel is made of solar cells. They are used to convert solar energy into electrical currents.

[SE/4]: Each n×m panel is independently mounted on gimbals on top of each L×W surface. The construction is in such a way that each one of the n×m panels has at least two independent degrees of attitude freedom, 2p and 2r, with respect to the SE structure frame 2f. [SE/5]: FIG. 2 illustrates n×m panels on each L×W side of a Satellite Engine structure frame. Gimbals rings on SE's L×H and W×H sides 2a 2b 2c 2d are designed to provide independent attitude controls of antennae or lamps or any direction pointing devices. Some antennae are used to discharge frequency agile and intensity agile energy beams to earth. Some antennae are used to transmit or receive frequency agile energy beams between SEs. Other antennae are used for communication purposes. Lamps are used to discharge to earth infrared radiations, laser lights or incandescent lights. The number of side gimbals antennae or devices are not limited to only four 2a 2b 2c 2d as illustrated in FIG. 2.

[SE/6]: Additional features displayed in FIG. 2 are identified as follows:

2f SE structure frame. The L×W×H box.

2h A typical set of gimbals rings which measure and control each reflector/solar-cell panel's attitudes 2r 2p with respect to SE structure frame 2f.

2p One of the two degrees of attitude freedom of each panel with respect to SE structure frame.

2r One of the two degrees of attitude freedom of each panel with respect to SE structure frame.

2q Reflector/solar-cell panel's possible third degree of attitude freedom with respect to SE structure frame. This will require larger spacing between panels.

2a Frequency agile and intensity agile RF or MMW or Microwave energy pulse train transmitting antennae.

2b Reflector/Solar-Cell panels.

2c Gimbals mounted infrared lamps or incandescent light lamps or laser antenna.

2d Reflector/Solar-Cell panels.

In addition, each SE has a number of subsystems residing in its structure frame 2f. They are not shown in FIG. 2, but they are identified below as:

2w Momentum wheels or other means are used to control and maintain attitude stabilization of SE structure frame 2f with respect to inertial space (see feature [C/#] below).

2n Navigation subsystem.

2p Energy transformation subsystem: Transform dc current from solar cells into infrared, frequency agile and intensity agile energy pulses (see features [F/#]).

2c Computer subsystem.

2z Communication subsystem.

2i Retractile receiver designed to receive energy beams from other SEs.

2y Power regulator.

2e Energy storage devices are used to store solar energy collected when SE is outside earth's shadow. This energy can be used when SE is inside earth's shadow.

2u Optical camera package (optional or as part of RSDs).

2v Synthetic Aperture Radar package and antenna (optional or as part of RSDs).

2w Thermal imaging camera package (optional or as part of RSDs).

2x Infrared camera package (optional or as part of RSDs).

V.3 [OP/#]: FEATURES RELATING TO SEs ORBITAL OPERATIONS. A major feature [OP/1] is covered in this section. Ten additional features [OP/1], ..., [OP/10] are covered in separate paragraphs.

[OP/1]: As a minimum SWMS configuration, all orbiting SEs are placed in a pair of non-coplanar orbits. These orbits are inclined slightly with respect to each other. In this case, all SEs are apportioned about equally to and distributed uniformly along these two orbits. If both orbits are rotated into a single plane, one orbit will always be slightly higher than the other orbit. The orbits are thus nonintersecting and preferably non-coplanar. Unless otherwise specified, the following descriptions will be for SEs operations on a pair of nonintersecting-noncoplanar orbits.

[OP/2]: At the center of each SE will be the origin of two coordinate systems both moving with the SE along its orbit. One set of solar-fixed axes has one axis that constantly points at the center of the sun. These coordinate axes have an average angular rate of one revolution per year with respect to inertial space. Another set of axes are fixed with respect to the SE structure frame. During normal operations that set will continuously tilt slightly with respect to the solar-fixed axes as required by the mission.

A third set of completely inertial coordinate axes is needed to relate vectors from one set of solar-fixed axes to another.

[OP/3]: In a typical SWMS operation, each SE 3n in the lower orbit maintains its n×m solar reflector panels (on one L×W surface) facing the general direction of the sun. Simultaneously, each lower orbit SE's other L×W surface will have its n×m solar cell panels facing away from the sun. At the same time each SE 3m in the higher orbit will have its n×m solar cell panels (on one L×W surface) facing the general direction of the sun. Its other n×m solar reflectors (on its other L×W surface) will be facing away from the sun.

Each SE experiences two modes of operation during each orbit around the earth. These two modes are defined according to the position of the SE which is inside or outside the earth's shadow. Consider these two cases:

[OP/4]: First, when SEs are outside earth's shadow: In this case the SEs' reflector/solar-cell panel arrangements are as specified in section [OP/3]. These arrangements allow incoming solar rays 3a from the sun to be reflected as shown at 3b from the lower orbit SEs' reflectors to SEs reflectors on the higher orbit before finally being re-reflected as solar rays 3c to earth.

[OP/5]: The electricity generated by the higher orbit SEs' solar cell panels is used to supply each SE's internal needs. Excessive electricity is transformed to different forms of energy beams and discharged to earth via antennae or lamps or stored for later use. At the same time, each lower orbit SE's 3n solar cell panels on one of its L×W surfaces are facing away from the sun. These solar cells receive solar rays 3r reflected from earth or 3b reflected from other SEs. Electricity generated by these solar cell panels is used to supply each Se's internal needs. Any excess electricity is transformed to different forms of energy beams and discharged to earth via antennae or lamps or to another SE or stored for later use.

[OP/6]: Second, when SEs are inside earth's shadow and when solar or laser rays are required in the shadow: In this case, selected SEs in the shadow and in both orbits 3m' and 3n' have their n×m reflector panels facing away from their respective SE structure frames. These SEs are identified as 3m' and 3n' in FIG. 3. This arrangement allows solar rays or laser beams to be passed alternately between these SEs 3m' and 3n. This scheme moves energy beams 3z in a zig-zag pattern into the earth's shadow 3t before discharging to earth 3l' or to a high flying SPSA 3p.

[OP/7]: Some SEs are equipped with large capacity energy storage devices. Energy collected and stored during daytime can be discharged during nighttime.

[OP/8]: FIG. 3 illustrates a sample case of two nonintersecting-noncoplanar orbits slightly inclined with respect to the equatorial plane. In FIG. 3, each SE is represented by three short dashes parallel and next to a longer dash spanning the three short dashes. SEs on the higher orbit 3h are labeled 3m. SEs on the lower orbit 3g are labeled 3n. The three short dashes or 3m 3n represent the L×W side of an SE with its n×m solar cell panels facing away from the SE structure frame. The corresponding longer dash of 3m or 3n represents the L×W side of an SE with its n×m reflector panels facing away from the SE structure frame. In general, when SEs are outside earth's shadow 3t, all SEs 3m in the higher orbit 3h have their solar cell panels (three short dashes) facing the general direction of the sun. Similarly, all SEs 3n on the lower orbit 3g have their reflector panels (one long dash) facing the general direction of the sun.

[OP/9]: Other features and labels in FIG. 3 are identified as follows:

3a Solar rays directly from the sun.

3b Solar rays reflected once from one SE to another SE or to earth.

3c Solar rays reflected twice from two SEs (3n and 3m) before being reflected to earth or to an SPSA.

3d Dash lines are used to represent the path of frequency agile & intensity agile RF, MMW energy beams, infrared radiations, laser beams or incandescent lights emitted from SE antennae or lamps.

3e Earth's direction of rotation about its spin axis (earth being viewed from a position over the northern hemisphere).

3f Direction of earth's orbit path around the sun (earth being viewed from a position over the northern hemisphere).

3g Lower orbit of a typical pair of nonintersecting-noncoplanar orbits.

3h Higher orbit of a typical pair of nonintersecting-noncoplanar orbits.

3i Average velocity vector of an air mass independent of current SEs actions.

3j Average velocity vector of an air mass induced by current SEs actions.

3k Vector sum of 3i and 3j.

3l Earth's land surfaces.

3l' Illuminated sports stadium (e.g., a stadium lighted during night games) or orange groves warmed by solar rays 3z during freezing nights.

3m SE in higher orbit 3h. Its n×m solar cell panels (on one L×W side) face the general direction of the sun 3a. Simultaneously, its other n×m panels have their reflectors facing away from the sun.

3n SE on the lower orbit 3g. Its n×m reflector panels (on one L×W side) face the general direction of the sun 3a. Simultaneously, its other n×m panels have their solar cells facing away from the sun.

3m' Selected SEs in higher orbit 3h in earth shadow. These SEs are used to transmit solar or laser rays 3z into the shadow.

3n' Selected SEs in lower orbit 3g in earth shadow. These SEs are used to transmit solar or laser rays 3z into the shadow.

3w Earth's ocean, lake or other wet surface.

Figure 4A:
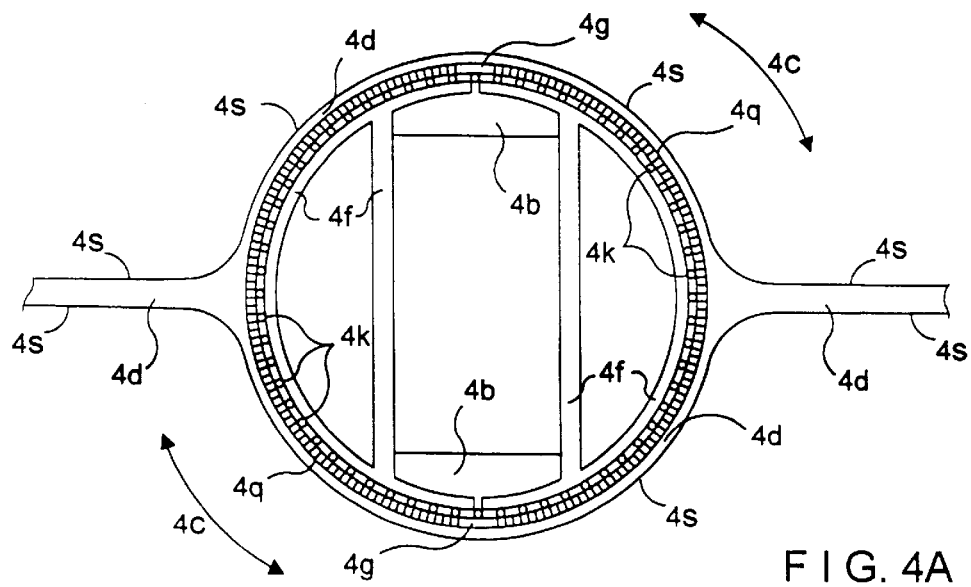
FIG. 4. Solar Powered Satellite Airplane (SPSA) Design.
Figures 4B, 4C:
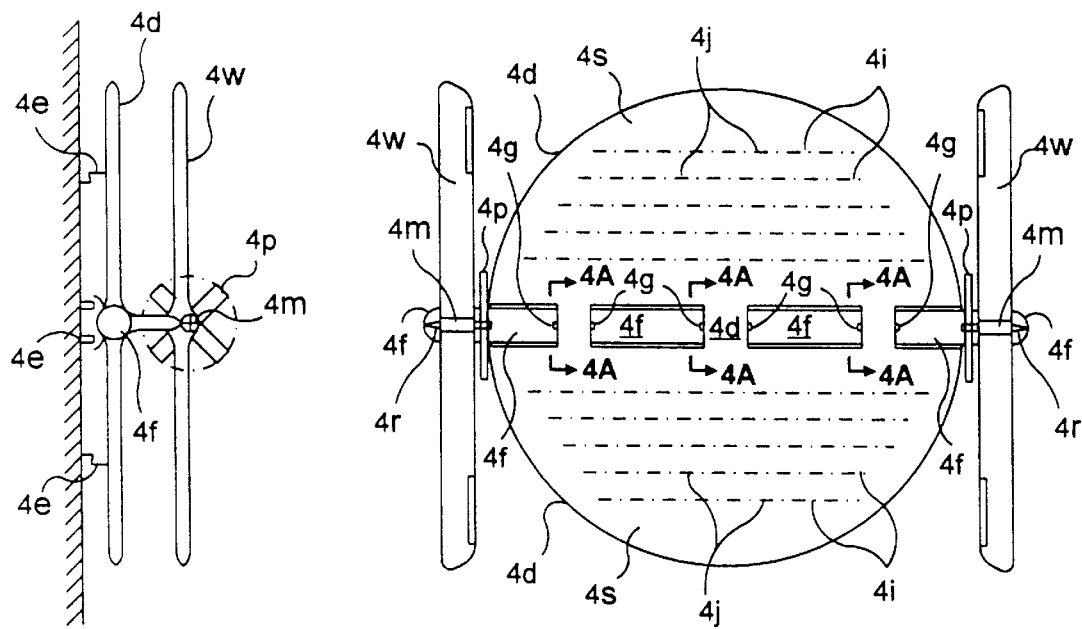
Figure 4D:
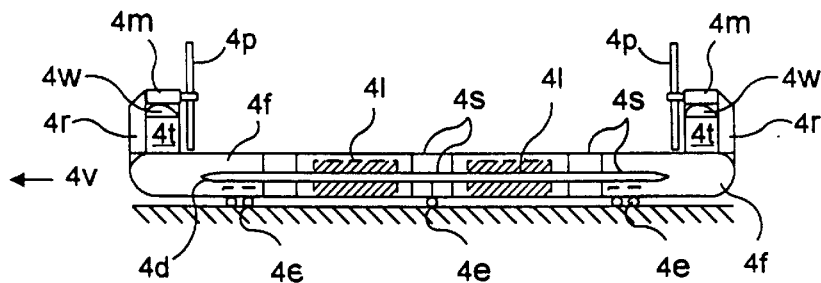

3p High altitude and long endurance Solar Powered Satellite Airplanes (see FIG. 4). SPSA continuously receives solar rays or MMW energy or laser beams from SEs. SPSA can also receive energy from ground.

3q Cloud or air mass whose compositions, thermodynamic and dynamic properties are being modified by SEs.

3r Reflection of solar energy from the clouds, ocean or land back to space.

3t Earth's cone shaped shadow.

3z Solar rays reflecting alternatively between SEs 3m', 3n' on different orbits 3h, 3g, when these SEs are inside earth's shadow 3t. These energies 3z can be used to power SPSAs 3p or to warm cold ground patches 3l' at night.

[OP/10/1]: The n×m panels nay be arranged in a way slightly different from the one described so far. It is possible to mix the number of solar-cell panels and the number of reflector panels on each L×W side of each SE. This arrangement applies to all SEs in both orbits 3h, 3g as follows: Each L×W side of each SE will have (n×m−k) reflector panels and k solar-cell panels facing away from its SE structure frame, where k=0,1, . . . , (n×m). For each L×W side, the exact k number is dependent on each SE's internal power consumption need and its mission requirements. This arrangement is especially useful for SEs in geo-synchronous orbit.

V.4 [RSD/#]: FEATURES RELATING TO REMOTE SENSING DEVICES (RSDs) INTEGRATION. A major feature [RSD/0] is covered in this section. Two additional features [RSD/1] and [RSD/2] are covered in separate paragraphs.

[RSD/1]: Remote Sensing Devices (RSDs) 1c comprise millions of independently operated sensors. These RDSs are located on the ground, on the water, in the air, on SPSAs, or on SEs. RSDs perform independent measurements such as monitoring sunspots, measuring the composition and thermodynamics properties of a particular atmospherical air mass, monitoring the effect of SEs' energy beams, etc.

[RSD/2]: Each sensor continuously makes redundant measurements. Each measurement is time and location tagged and transmitted to a specified Ground Control System (GCS) 1d computers at regular intervals. These data are in standard formats so that they can be quickly correlated, analyzed and accepted by various algorithms and mathematical models in the GCSs 1d computer network.

V.5 [GCS/#]: FEATURES RELATING TO GROUND CONTROL STATIONS (GCSs) DESIGNS. GCSs provide the guidance of each energy beam. This includes the selection of each energy beam's characteristic and its corresponding Adjusted Aim Point (AAP) trajectory. A major feature [GCS/0] is covered in this section. Three additional features are [GCS/1], GCSs subsystem overview; [GCS/2], simplified GCS tasks design; and [GCS/3], a typical matured GCS subsystem tasks design and partition.

[GCS/1] GCS overview: Each Ground Control Station (GCS) 1d' includes a network of interconnected supercomputers, electronic libraries, data receivers, data storage devices, data transmitters, visual display devices and control consoles. There are hundreds of GCSs 1d in the SWMS. Each GCS monitors weather conditions within a designated region of earth. Each GCS receives designated RDSs measurements 1n', local weather requests 1f' and data from other GCSs 1z. Each GCS also transmits estimated tasks 1r' to a specified group of SEs and receives data from other GCSs 1z. Data generated by each GCS are broadcast to all other GCSs 1z. Therefore, each GCS will have detailed global weather information and status of all SEs at discrete time points. Each GCS will take its turn to be the master GCS, which coordinates the operations of all GCSs in the SWMS. (NOTE: the notations 1d', 1n', 1r', 1f' represent designated GCSs, selected RSDs' data, specified SEs' tasks and local weather requests respectively. Their corresponding notations without the ' given in FIG. 1 are for all GCSs, all RSDs data, all SEs tasks and all weather requests.)

[GCS/2] Simplified GCS tasks designs: In most SWMS applications, SEs' assignments involve only reflecting solar rays. This is the case for SWMS during its initial stage of development. In this stage of development a GCS's principal task involves defining AAPs (Adjusted Aim Points) trajectories of each energy beam (centerline of each reflected solar ray) in some earth fixed coordinate system.

The available solar energy and the directions of incoming and reflected solar rays to and from each n×m reflector panel can be calculated as a function of time. These calculations use measurements of SE structure frame orientations with respect to inertial space, orientation measurements of each reflector panel gimbals with respect to its SE structure frame and orbital mechanics.

On the other hand, the desired aim point of each reflected energy beam and its trajectory are both specified by GCSs. This is done by distributing the aim points over the surface that is to be warmed by the solar rays. These aim points are then adjusted to take into account the atmospherical refraction and absorption of each energy beam and transform desired aim points to a corresponding set of AAPs (Adjusted Aim Points). A set of AAP vectors will be defined in an earth-fixed coordinate system. Each AAP point will be at the tip of its corresponding AAP vector. Next, AAPs trajectories are defined based on the amount of energy and rate of energy that is to be deposited onto the desired space. These estimated AAPs trajectories are transmitted to their corresponding SEs.

An LOS vector is defined as a vector from the center of any reflector panel to its corresponding AAP. Both this LOS vector and its corresponding reflecting solar ray vector are expressed in the same coordinate system, based for example on the SE structure frame fixed axes. Then the vector difference between these two vectors at a given time defines an error vector. This error vector specifies the required change of available energy beam's direction at that time.

The unit vector of each desired direction will be transformed to SE structure frame fixed coordinate axes. Assuming the SE structure frame follows a predetermined orientation schedule with respect to inertial space, then the desired gimbals angles of each reflector panel can be calculated from its unit desired direction vector. Also, each desired direction vector must satisfy the solar rays' availability constraints.

These computations must be repeated continuously many times a minute. This will provide the required error signal to the stepping motors to torque each gimbals ring. This scheme will control each reflected solar ray to follow its AAP trajectory in a timely fashion.

Figure 5:
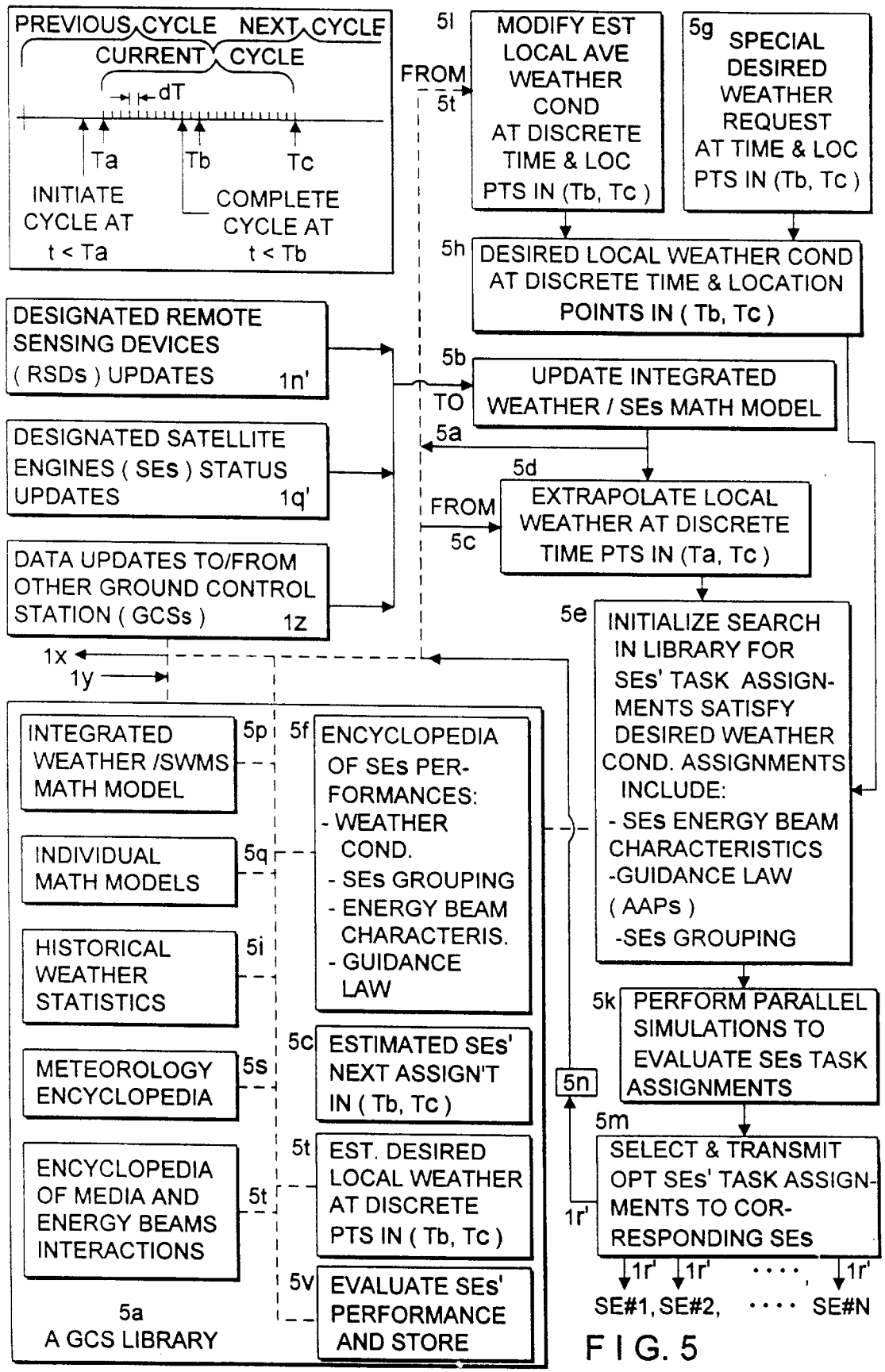
FIG. 5. Overview Of A Ground Control Station (GCS) Functions.

[GCS/3] Typical matured GCS tasks designs and partitions: FIG. 5 graphically illustrates typical SEs' assignments (energy beams' characteristic and their AAPs trajectories) estimation process designed for a more matured SWMS. Key functions are identified by blocks and connected by high speed data busses (dashed lines). The main processing sequence is: $5b$ $5d$ $5e$ $5f$ $5e$ $5k$ $5m$ $5n$ $5b$. Other functions of FIG. 5 are identified below:

$5a$ A GCS library. This includes individual mathematical models $5q$, integrated global-weather/SWMS (Satellite Weather Modification System) model $5p$, Historical weather statistics $5i$, Encyclopedia of energy beam transmission, refraction, absorption, and reflection characteristics in all kinds of weather conditions $5t$, Encyclopedia of meteorology $5s$, past SEs weather modification performance data $5v$, Catalogued encyclopedia of SWMS Satellite Engines performance $5f$ permitting rapid search for SEs task assignments that will satisfy the new weather modification constraints specified by $5e$.

- $5q$ Individual models include: Sun, sunspots, solar radiation, lunar orbital motion, solar wind intensity distribution, earth orbital motion, earth's gravitational model, atmospherical layer models, ocean current models, earth surface and subsurface models, natural and man-made discharges, absorption, refraction models, etc. Satellite Engines model, SE system performance models, interactions between atmosphere models and all other models, etc.
- $5i$ Historical global and local weather data statistics, including such data as annual rainfall distributions, annual temperature distributions, seasonal weather conditions, etc.
- $5t$ Encyclopedia of the interaction of energy beams with atmosphere, land mass and sea surfaces.
- $5f$ Encyclopedia of SEs performance data classified according to: energy types and characteristics, guidance law employed (AAPs' trajectories), initial atmospherical conditions, required atmospherical conditions changes, Satellite Engines sub-groupings. These data are continuously updated by off-line simulations $1y$ and by data from actual SEs past performances $5v$. Data $5f$ output back to $5e$ will include SEs groupings, each energy beam characteristics and AAP' trajectories, all expressed as functions of time.
- $5l$ Estimate the desired weather conditions in next (Tb,Tc) interval based on past weather condition statistics. Desired weather is expressed in terms of weather characteristic vectors for each affected weather cell.
- $5g$ Special desired weather condition requests. All requests are expressed in terms of weather characteristic vectors sequences for each weather cell. Both weather cells and weather characteristic vectors are defined in $5d$.
- $5b$ Update integrated mathematical model using designated RSDs $1n'$, designated SEs' status reports $1q'$, and updated data from other GCSs $1z$. The results of these updates yield an up-to-date integrated global weather math model with Satellite Engines' math models integrated in the total model. The resultant model is to be used for further extrapolations $5d$, for storage in local GCS library $5a$ and for broadcasting to all other GCSs $1z$.
- $5c$ Estimations of selected SEs' task assignments for the next (Tb,Tc) interval based on anticipated requirements from $5l$ and $5g$. These estimates are passed on to $5d$.
- $5v$ Off-line evaluation of SEs performances in the previous (Tb,Tc) interval using actual RSDs measurements $1n'$ and previous cycle SEs' assignments $1r'$ adjusted by actual SEs status reports $1q'$. Results of SEs performance evaluations are used to update GCS library data $5t$, $5f$ and $5q$.
- $5d$ Forward extrapolation of integrated mathematical model $5b$, from t=Ta to t=Tc, in equal dT increments, where dT=(Tc−Ta)/N and N=a large even integer. If the actual RSDs measurements for the (Ta,Tb) interval are in agreement with previously estimated weather parameters, then this extrapolation process can be reduced to only the (Tb,Tc) interval.

The atmosphere is subdivided into weather cells. The average thermodynamics, dynamics and air composition parameters inside each weather cell are represented by a vector called the weather characteristic vector. Each weather cell is represented by its weather characteristic vector for a fixed time duration.

- $5e$ First, find the required weather changes by taking the differences between the extrapolated weather conditions from $5d$ and the corresponding desired weather conditions from $5h$. This is done by manipulating the corresponding weather characteristic vectors.

Next, initialize a search in $5f$ for the SEs' task assignments during the (Tb,Tc) interval. SE task assignments from $5f$ will include parameters which define each energy beam's characteristics and its Adjusted Aim Point (AAP) trajectory. This search uses the initial weather conditions from $5d$, required weather changes from $5d$ and $5h$. However, a sequence of desired weather conditions from $5h$ is selected at reduced constraint levels. This will ensure that at least one set of the answers found from $5f$ will later satisfy the criteria in $5k$.

Found in $5f$ are SE's task assignments which include each one of its energy beam's characteristics as a function of time and their corresponding Adjusted Aim Point (AAP) trajectories.

Each SE assignment parameter is found by matching stored $5f$ energy absorption patterns or thermodynamic changes patterns with their corresponding required change patterns $5e$.

- $5k$ The SEs' tasks assignments found in $5f$ are evaluated by performing parallel simulations. The results of these simulations should determine which set of SEs assignments best satisfies the desired weather conditions imposed on the SEs by $5h$. All calculations are done in terms of weather characteristic vectors at the weather cells' levels 5d.

5m Define detailed Satellite Engines' task time lines based on optimal selection from 5k. These assignments are transmitted to the corresponding SEs 1r'. A second set of these assignments is sent to 5c for the next computation cycle. A third set of these data is sent to the GCS library data bus to be broadcast as indicated at 1z to all GCSs in the SWMS. This last step is necessary to take care of conditions when a GCS is reassigned to manage a different set of SEs in the next computation cycle.

5n Initialize the next computation cycle. The current (Tb,Tc) interval is shifted down to become the next (Ta,Tb) interval, and a new (Tb,Tc) interval is selected with the old Tc set to equal to the next Tb. The next computation cycle repeats at 5b.

The descriptions set out above outline a typical process to define SEs grouping, each energy beam type, each energy beam's physical characteristics and its Adjusted Aim Point (AAP) trajectory. These parameters are transmitted to their corresponding SEs 1r'.

NOTE: 1x, 1y, 1z, 1r', 1q' and 1n', refer to the same items identified in FIG. 1. The prime ' denotes that these data belong to only a subgroup of SEs or subgroup of RSDs.

V.6 [C/#]: FEATURES RELATING TO CONTROL ENERGY BEAM DIRECTIONS.

One major feature [C/0] is covered in this section. Two additional features [C/1] and [C/2] are covered in separate paragraphs.

[C/1] Overview: Each SE shall release its energy beams in a timely fashion following its AAP trajectory as specified by its GCS 5m. SE's control subsystem aims each energy beam at its AAP (Adjusted Aim Point) and makes each energy beam follow its AAP trajectory in a timely fashion.

[C/2] Direction controls: This energy beam directional control task is partitioned into two sub-tasks. First, control the orientation of SE's structure-frame axes with respect to inertial space. This is done by using inertial flywheels or other means. Second, control the orientation of solar-reflector/solar-cell panels, antenna dishes, or lamp axes with respect to the SE's structure-frame axes. This is done by measuring the actual gimbals angle settings and torquing each gimbals ring to its desired orientation. Each energy beam's desired orientation at a given time is defined by its unit vector from reflector (or antenna or lamp) center to its AAP at that time. Using, for example, the directional cosine technique, these desired unit vectors can be transformed into desired gimbals angles. A more detailed description on how this is done has been presented above at [GCS/2].

V.7 [F/#]: FEATURES RELATING TO ENERGY BEAM FREQUENCY AND INTENSITY SELECTIONS. A major feature [F/0] is covered in this section. Seven additional features [F/1], . . . , [F/7] are covered in separate paragraphs.

Solar rays will be the primary energy beams discharged by the SEs. However there are times when other types of energy beams are required to penetrate a cloud layer, or to heat up a specified air mass of specific composition. In these cases, frequency agile and intensity agile energy beams are used. The frequency of an energy beam determines its ability to penetrate a layer of atmosphere of a specified composition. It also determines the degree of absorption of a given frequency energy beam by an air mass of a particular composition. Weather cells air mass compositions are estimated by Remote Sensing Devices (RSDs).

[F/1]: A specific energy beam's frequency and intensity will be selected to satisfy a given depth of atmospheric penetration and to yield a specified energy absorption contour or temperature elevation contour.

[F/2]: The change of energy into heat is monitored by RSDs, such as infrared sensors or thermal imagery cameras. Or it can be estimated from specially designed ground receivers. These receivers measure the presence of frequency agile energy beams which are frequency, amplitude or phase modulated. These RDSs data are used by GCS or by SEs directly, thus enabling adaptive adjustments of energy beams' frequencies and intensities.

[F/3]: Energy intensity at a given location is also controlled by energy beam guidance laws which specify each energy beam Adjusted Aim Point's (AAP's) trajectory, the speed AAP moves along its trajectory, dwell times, locations on an AAP trajectory and the shape of an AAP trajectory.

[F/4]: Selection of each frequency agile energy beam's frequency rests on the knowledge of the energy beam's attenuation due to atmospherical absorption, reflection and refraction. These data are stored in the GCS electronic library 5t as dB/Km (or watts or % transmission loss per kilometer of the energy beam path) vs frequencies for different atmospheric compositions.

[F/5]: For a given atmospheric composition the dB/Km values show a sharp drop within certain narrow frequency bands called windows (Radar and the Atmosphere by A. J. Bogush, Jr., Artech House 1989). Near the left end of each window, the parameter dB/Km experiences a sharp drop in value (dB/Km/f<<0). Near the right end of each window, the parameter dB/Km experiences a sharp rise in value (dB/Km/f>>0). The frequency of each frequency agile pulse (or beam) is selected near either end of these frequency windows to permit injection of frequency agile energy pulses into selected regions of the atmosphere.

[F/6]: Energy levels are selected to achieve the rates at which the accumulated energy absorption will change the thermodynamic and dynamic parameters of the atmosphere in a predetermined way. An example of such a rate is the rate of average temperature rise within a group of weather cells.

[F/7]: Furthermore, the energy level must satisfy safety requirements (Introduction to Radar Systems by M. I. Skolnik, McGraw-Hill Book Co. 1962).

V.8 [W#/#]: FEATURES RELATING TO BASIC WEATHER MODIFICATION TECHNIQUES. There are four major features [W1/0], . . . , [W4/0] covered in respective sections. A total of 12 (=6+2+2+2) additional features are set out separately. These additional features are:

[W1/1], . . . , [W1/6],
[W2/1], [W2/2],
[W3/1], [W3/2],
[W4/1] and [W4/2].

Basic techniques employed by SWMS to modify weather are listed below. Other weather modification requirements can be met by making different combinations of these basic techniques. These techniques are identified as basic weather modification techniques #1 through #4 ([W1/0], . . . , [W4/0]).

V.8.1 [W1/#]: FEATURES RELATING TO MODIFYING GLOBAL WEATHER CONDITIONS. This technique employs a very large number of Satellite Engines (SEs) to modify global weather conditions by blocking or redirecting solar rays. One major feature [W1/0] is covered in this entire section. Six additional features [W1/1], . . . , [W1/6] are covered in separate paragraphs.

[W1/1]: This method involves using millions (or even billions) of Satellite Engines (SEs) to block or redirect solar rays. Typically, this requires a large number of low inclination and non-coplanar orbits near the equatorial plane. When the earth requires cooling, the Ground Control Stations (GCSs) simultaneously command all SEs to rotate their n×(m−k) (k=0,1, . . . <<m) reflector panels (on one L×W side) to face the general direction of the sun and away from earth. These SEs block part of the solar energy from reaching the earth by reflecting the solar energy away from earth and thus assist the earth's cooling process.

Each SE will reserve k solar cell panels (along with n×(m−k) reflector panels) to face the sun. These solar cell panels are used to generate electricity for the SE's internal use. The value of k is such that k=0,1,2, . . . , <<m. The K0 case implies that solar cells located on the back side of each reflector panel or on its other L×W surface can generate sufficient electricity for the SE's internal use.

[W1/2]: The reflected solar rays' guidance is done by specifying the Adjusted Aim Points (AAPS) of each reflected solar energy beam and trajectories of these AAPs in deep space away from earth. In this case the AAPs can be simply computed as the line-of-sight aim points, because the reflected solar rays will have little or no interference (refraction) by the atmosphere.

[W1/3]: It is to be noted that when the equatorial regions become cooler, the average temperature differences between the polar regions and the equatorial regions are reduced. Therefore this technique may be used to modify global weather patterns or to create favorable local weather conditions which can be further modified by SWMS.

[W1/4]: When controlled cooling is not required, GCSs command some or all SEs to direct their collected solar energy to other SEs or to earth directly. Again, this is done by specifying the AAPs of each energy beam and their trajectories to the desired locations on earth or at specified Satellite Engines' reflector panels or solar cell panels. This process selectively cools certain regions but at the same time heats up other regions. This technique can also be used to supply energy to specific devices. All these tasks are under GCSs control.

[W1/5]: If these temperature differential regions are sufficiently close, an air mass motion is introduced which forces the air mass to move from the high pressure region to the low pressure region. This technique can be used to move an air mass of specific composition from one location to another. This technique can also be used to modify the jet stream path and therefore modify the weather on either side of the jet stream.

[W1/6]: Distributing AAPs over a small wet surface and aiming solar rays at these AAPs will cause evaporation. This will increase the humidity of air above the wet surface. As the humid air rises to higher altitudes clouds will form. These clouds can be used to cool local regions by blocking the sun's rays. They can also cause precipitation.

V.8.2 [W2/#]: FEATURES RELATING TO MODIFYING LOCAL WEATHER CONDITIONS. This technique is similar to feature

[W1/6] but requires far fewer Satellite Engines (SEs) Also, SEs orbits are paired as specified in feature

[OP/0]. One major feature [W2/0] is covered in this entire section. Two additional features [W2/1] and [W2/2] are described in separate paragraphs.

[W2/1]: This technique can be used to warm a local region. This is done by distributing AAPs (of all SEs' reflected energy beams) over the region to be warmed. Each reflected energy beam will be assigned to dwell at a given AAP for a given duration, or each AAP trajectory will be limited to circle within a desired region.

[W2/2]: This technique can be used to create a high humidity air mass or to form clouds. This is similar to feature [W2/1] above, except that the reflected solar rays are aimed at AAPs distributed over a wet surface, such as a lake or a patch of ocean. This process is originated by Ground Control Stations (GCSs) defining the AAP trajectory of each energy beam over the wet surfaces. Satellite Engines (SEs) then reflect solar rays to their respective AAPs. This process is essentially the same as one that occurs in nature, except that both the wet surface area and the timing are selected and controlled by SWMS. Also, the intensity of the solar ray can be made more concentrated than what occurs in nature. This process will increase the moisture content of the air mass above the heated wet surface. As the high humidity air rises to higher altitudes, it begins to cool and form clouds.

V.8.3 [W3/#]: FEATURES RELATING TO MOVING AN AIR MASS UPWARDS. One major feature [W3/0] is covered in this entire section. Two additional features [W3/1] and [W3/2] are covered in separate paragraphs.

[W3/1]: This technique is designed to initiate and/or modify an air mass's upward notion. This is done by adaptively aiming energy beams of specified characteristics at specified AAPs. These AAPs are distributed in a vertical column inside or near the air mass that is to be moved. The type, frequency, intensity and AAP trajectory of each energy beam are adaptively selected based on sensors' feedback measurements which lead to optimal upward movement of the air mass due to energy absorption. Combinations of energy beam characteristics with guidance law (AAPs trajectories) options are simulated to obtain an optimum combination. One such criterion to judge the optimum combination can be a criterion which determines the rate of climb at which this air mass will rise to higher altitudes.

[W3/2]: Some SEs are located on earth's surface for this purpose. Other SEs may be in the air or move with the rising air column. These ground based or sea based SEs are used to heat the air column from below.

V.8.4 [W4/#]: FEATURES RELATING TO MODIFYING AN AIR MASS'S HORIZONTAL VELOCITY COMPONENT. One major feature [W4/0] is covered in this entire section. Two additional features [W4/1] and [W4/2] are covered in separate paragraphs.

The best way to transport an air mass of specific composition and thermodynamic properties is to allow it to be carried by wind currents that exist in nature at that time. However, natural wind does not always satisfy weather modification requirements. The following techniques to transport an air mass are presented.

[W4/1]: This technique includes creating a pressure differential on either horizontal side of the air mass to be moved. This technique is similar to the one discussed in section [W1/5], except in this case in air mass size and movement are very localized. This technique requires unequal distribution of energy into two adjacent sides of the air mass to be moved. This is done by unequal concentrations of energies, AAPs, or energy beams' dwell times on either side of an air mass.

Figure 6:
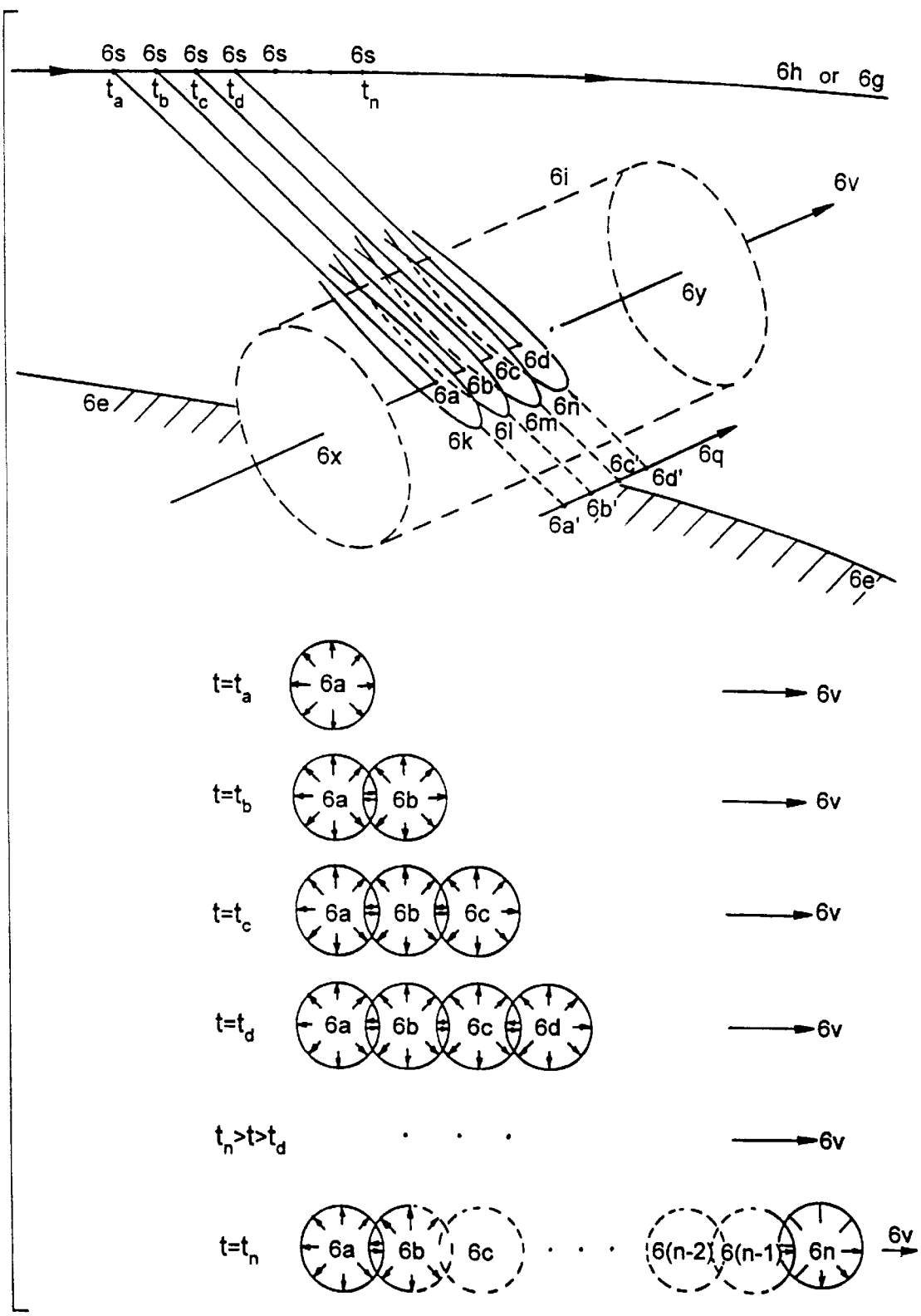
FIG. 6. Techniques To Modify Air Mass Velocity Component.

[W4/2]: This case involves concentrating AAPs trajectories along a desired direction of air mass motion. FIG. 6 illustrates this concept. Consider the case where an air mass has no initial lateral motion component. The objective is to move the air mass near 6x to points near 6y. First, define this desired direction by an arrow 6v relative to earth 6e, which may be inclined at an angle with respect to the local gravity vector. Next, imagine a large tube 6i enclosing the air mass to be moved and with the desired directional arrow 6v along tube's centerline 6x–6y. Next, define a sequence of AAPs (6a', 6b', 6c', 6d', . . . ), such that the maximum energy absorption of each energy beam will be made to concentrate near the centerline of the tube (at 6a, 6b, 6c, 6d, etc., respectively) All these AAPs are estimated by GCSs and transmitted as assignments to the SEs 6s on orbits 6h or 6g. Note: each 6s' point in FIG. 6 can represent many SEs. These SEs will first (at t=ta) concentrate all their energy beams at AAP 6a' near point 6x. This large input of energy will cause the air mass near 6a to absorb the energy and expand rapidly in all directions. Assume a constant temperature contour (resulting from absorption of these energy beams) can be represented by a tear shaped figure labeled 6k. Next (at t=tb), let these SEs shift their common aim point to an adjacent AAP at 6b'. This will result in rapid heating of another air mass centered at 6b. This will cause another tear shaped constant temperature contour labeled by 6l. Continuing this process is like producing a sequence of small "explosions" along the imaginary tube's centerline. The size of each "explosion" is controlled by the number of SEs (or energy beams) shearing the same AAP at a given time. The speed of the induced air mass velocity component along 6v also depends on the spacing and rate of change of these AAPs or energy beams dwell times along their AAP trajectories. When energy focus reaches the end of the tube 6y, this process can be repeated again starting near 6x.

This concept can be explained in another way by considering the rows of small circles in FIG. 6. Each small circle represents the expansion due to absorption of concentrated energy beams at a given location 6a, 6b, 6c, . . . etc. The small arrows radiating out from the center of each small circle in FIG. 6 represents the direction of the local air velocity. As the energy center moves from 6a to 6b to 6c . . . , the velocity components between energy centers cancel each other out. What is left over is only the velocity component in the desired direction 6v. When the energy beams are removed, the surrounding cooler air will rush back into the imaginary tube 6i and push the air in the 6v direction. This technique will always introduce an air mass velocity component in the local vertical direction. This vertical velocity component may not be a bad feature in many applications, as when moving a humid air mass inland and allowing it to condense to rain. The horizontal velocity component will move the air mass inland. The vertical velocity component will allow the air mass to move to a higher and colder altitude. This will delay the air mass's condensation into rain until it has reached its desired location. If the air mass has an initial lateral velocity component 3i, then the final air mass velocity vector 3k is the vector sum of its velocity vector caused by its initial velocity 3i plus the SWMS induced velocity vector 3j.

The best way to use this technique is to first create a rising column of air near 6y using techniques described in section [W3/0]. Next, simultaneously applying the teachings at [W3/0] and [W4/2] will cause the air mass inside the imaginary tube 6i to feed to the rising air column created by [W3/0].

[A#/#]: FEATURES RELATING TO SATELLITE WEATHER MODIFICATION SYSTEM (SWMS) APPLICATIONS. There are five major features [A1/0]–[A3/0], . . . , [A6/0] respectively covered in separate sections. There are a total of 16 (=0+0+3+0+8+5) additional features respectively covered in separate paragraphs. These additional features are:

[A3/1], . . . , [A3/3],
[A5/1], . . . , [A5/8],
[A6/1], . . . , [A6/5].

Figure 7:
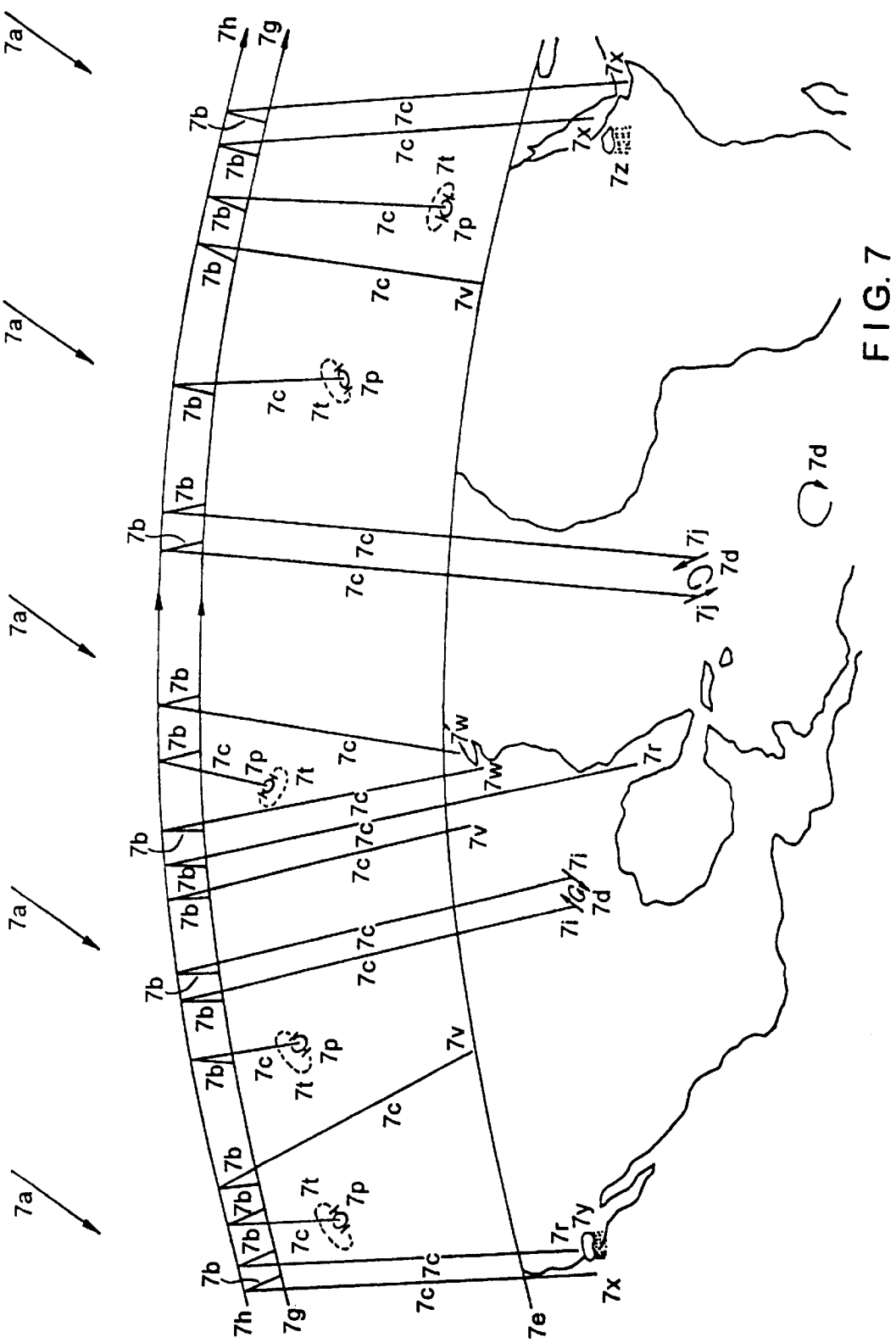
FIG. 7. Some Satellite Weather Modification System (SWMS) Applications.

Some SWMS applications are designed to employ various combinations of the basic weather modification techniques described in section V.8. Other applications are related to energy supply and solar powered airplanes (FIG. 4). All applications are designed to offer unique and useful services. All applications are selected to have the potential to compete successfully in the real business world. Some of these SWMS applications are illustrated in FIG. 7 and described below.

V.9.1 [A#/#]: FEATURES RELATING TO INCREASING PRECIPITATION. One major feature [A1/0] is covered in this section.

[A1/0]: High humidity air masses are created by application of techniques specified in sections [W1/6] AND [W2/2] over wet surfaces 7x to cause cloud formation. Cloud temperatures are maintained by techniques covered in sections [F/0], [W3/0] and [W4/2]. The air mass is allowed to move to a desired location by natural wind current or by techniques specified in sections [W3/0], [W4/1] and [W4/2]. The cloud is left to cool down by a natural cooling process. This produces precipitation over the desired area. This technique can be applied to many dry regions of the world. Potential application regions are in southern California 7y, northern Ethiopia 7z, etc.

V.9.2 OMITTED

V.9.3 [A3/#]: FEATURES RELATING TO CREATING WHIRLWINDS. One major feature [A3/0] is covered in this section. Three additional features [A3/1], . . . , [A3/3] are covered in separate paragraphs.

[A3/1]: Techniques specified in section [W3/0] or [W4/0] can be used to move two air masses in opposite directions (or in the same direction but at different speeds). These air masses are offset by a small distance. This process will create a whirlwind or a small tornado.

[A3/2]: Alternatively, the movement of one of the air masses can be due to natural causes.

[A3/3]: Whirlwind or tornado strength can be ncreased (decreased) by combining and colliding many smaller whirlwinds rotating in the same direction 7j (opposite directions 7i), thus creating a stronger (weaker) whirlwind.

V.9.4 [A4/#]: FEATURES RELATING TO WARMING LAND, SEA AND AIR. One independent feature [A4/0] is covered in this section.

[A4/0]: Techniques described in sections [W1/4] and [W2/1] can be used to warm a land mass directly or to warm the air mass immediately above the land mass. This is done by distributing the AAPs over the region of interest. That is, the SEs are commanded to discharge solar rays or infrared radiations at these AAPs for specified durations until the desired average temperature rise has been achieved.

A few degrees rise in temperature, for a few hours during extremely cold winter nights, can save many millions of dollars worth of fruit crop annually in Florida 7r. California 7r and many farms at high altitude. This same technique can be used to heat large greenhouse farms in the U.S. Northeast 7w, where the large demand for fresh farm produce now necessitates importation from great distances, using large amounts of fossil fuels.

V.9.5 [A5/#]: FEATURES RELATING TO SOLAR POWERED SATELLITE AIRPLANE (SPSA) DESIGNS AND APPLICATIONS. One independent feature [A5/0] is covered in this section. Eight additional features [A5/1], . . . , [A5/8] are covered in separate paragraphs.

[A5/1]: A Solar Powered Satellite Airplane (SPSA) is disclosed that utilizes the energy beams discharged or reflected from Satellite Engines (SEs) to power its flight at high altitudes. As an illustration of this concept, only solar rays reflected from SEs are considered here. However, a similar system can be designed to receive laser beams or microwave energy beam from SEs. The word SATELLITE in SPSA implies this airplane's dependence on Satellite Engines (SEs) and its ability to fly indefinitely in circles above the clouds and over a fixed land area. This is illustrated by racetrack shaped dash circles 7t in FIG. 7.

[A5/2]: FIG. 4 shows a typical SPSA design. This comprises a large hinged solar energy collecting disk 4d supported by two lift producing wings 4w located on either side of the disk. Arrays of solar cells 4s arranged on the disk 4d transform solar energy into electrical current. This electricity is used to power two electrical motors 4m, located on each wing, which drive two propellers 4p.

[A5/3]: Continuously adjusting SPSA headings and adjusting the disk tilt angles 4c (disk 4d roll angle about SPSA fuselage axis) will ensure that the solar rays reflected from Satellite Engines (SEs) 7c are as perpendicular to the disk surface 4s as possible at all times. This ensures maximum energy reception by the disk.

[A5/4]: The energy collecting disk 4d is designed to produce no lifting force during normal high altitude level flight.

[A5/5]: This zero lift condition is achieved by the combination of three design characteristics: First, the disk 4d has a plane of symmetry with respect to both of disk surfaces 4s. Therefore, when the angle of attack is zero, this disk will only produce a drag force. Second, during normal high altitude operations at any disk tilt angle 4c, this disk 4d will be maintained at zero angle of attack by its wings 4w. Third, independent adjustable slots 4j are arranged over the disk surface. Whenever pressure sensors 4i detect a pressure differential developing across the disk, these slots 4j will open automatically to let air flow from the high pressure side to the low pressure side of the disk, thus killing the lift force on the disk. Pressure sensors 4i are also distributed over the entire disk 4d and on both sides of the disk.

[A5/6]: During take-off and landing runs, SPSA's energy collecting disk 4d is rotated to be parallel to its two wings as illustrated in FIG. 4. These wings will control and maintain the disk at a non-zero angle of attack position. At the same time pressure sensors 4i are turned off. This causes all slots 4j to lock in closed positions. This scheme can be used to create lift force on disk 4d during selected mission phases, such as during take-off and landing runs.

[A5/7]: Ground Control Stations (GCS) 1d are used to estimate which Satellite Engines (SEs) are available to supply power 7c to which Solar Powered Satellite Airplane (SPSA) 7p. GCSs are also used to estimate the direction and intensity of each reflected solar ray 7c as functions of time. GCSs must focus a group of AAPs at the center of each SPSA disk 4d. Also, GCSs will estimate the trajectories of these AAPs' common focal points. The trajectory of one subgroup of AAPs' common focal point will become the flight path 7t of one SPSA. GCSs will also estimate the disk tilt angle 4c of each SPSA. This information is uplinked to each SPSA. Software on-board the SPSA will enable it to fly a flight path 7t specified by its AAPs' common trajectory 7t. At the same time the SPSA will tilt its disk 4d following the tilt angle 4c time-line specified by GCSs. Periodically, SPSA will shift to a different set of SEs, a different AAPs' trajectory and a different disk tilt angle time-line as commanded by a GCS.

[A5/8]: FIG. 4 illustrates basic design features of an SPSA. A top view and a front view show an SPSA in a take-off or landing configuration. Also, a cross-section view shows the disk tilting mechanism. Important SPSA features shown in FIG. 4 are identified below.

4b Electric motor, gear box and lock mechanism.

4c Solar energy collecting disk 4d tilt angle. Tilt angle is the same as roll angle about the SPSA fuselage axis.

4d Solar energy collecting disk.

4e Landing gears.

4f Fuselage.

4g Gear to tilt and lock disk at desired angle.

4i Pressure sensors located near slots 4j and distributed over both sides of the disk.

4j Slots distributed over the disk. Slots are normally closed. Slots will automatically open to balance any local pressure difference developed across the disk.

4k Roller rod bearings distributed over the fuselage circumference. They provide smooth tilting (roll) of the disk about SPSA fuselage axis.

4l Payloads.

4m Electric motor and gear mechanism used to drive the propellers.

4p Propellers.

4q Gear teeth attached to the disk 4d and arranged in a circle around the outer circumference of the SPSA fuselage 4f. These gear teeth are used to transmit torque which drives disk 4d tilt angles 4c.

4r Rudders.

4s Solar cell array cover the entire (one or both sides) disk 4d surface.

4t Vertical tails.

4v direction of SPSA forward notion.

4w Wings

V.9.6 [A6/#]: FEATURES RELATING TO BUSINESS VENTURES BASED ON SWMS & SWMS/SPSA SERVICES. One major feature [A6/0] is covered in this section. Five additional features [A6/1], . . . , [A6/5] are covered in separate paragraphs.

[A6/1]: Applications of Satellite Weather Modification System (SWMS) can be organized into unique global business ventures. There are strong demands for the types of services offered by SWMS. The services SWMS offers to the world are unique and non-existing at the present time. Both SWMS manufacture and services will generate new jobs and enhance the earth's environment at the same time. These features further strengthen the Satellite Weather Modification System (SWMS) potential as a useful invention. Therefore these SWMS business ventures are an important benefit of this invention.

[A6/2]: Stock can be issued and offered to the public to raise the necessary funds to finance these ventures. Raised funds will then be used to build prototypes of SWMS subsystems: Satellite Engines (SEs), Ground Control Stations (GCSs), Remote Sensing Devices (RSDs) and Solar Powered Satellite Airplanes (SPSAs).

[A6/3]: Initially a few basic services will be offered to potential customers who can afford to pay for SWMS services. In each orbit each SE can sequentially service many locations below its orbit. Therefore, by simply changing some computer codes these SEs can also service some non-paying customers as a public service.

[A6/4]: Some of the initial services to be offered by SWMS are illustrated in FIG. 7. Satellite Engines (SEs) distributed in the orbits (7h and 7g)are too small to be shown in FIG. 7. Solar rays 7a from the sun are first reflected 7b from the SEs in the lower orbit to SEs in the higher orbit before finally being reflected to earth 7c. Some initial services to be offered by SWMS are described below:

1. Techniques described in section [A4/0] are used to warm local regions during extremely cold winter days. Potential paying customers are orange growers in Florida 7r and California 7r, greenhouse farms 7w, etc. Potential nonpaying customers are small farmers at high latitudes, etc. p1 2. Solar Powered Satellite Airplanes (SPSAs) 7p (described in section [A5/0]) are used to carry communication relay instruments or weather monitoring equipment 4l over local regions. Potential paying customers are communication companies, news services, etc. Potential non-paying customers are public education services, environmental protection agencies, weather services, local police departments, etc. It is to be noted that when an SPSA flies a closed loop pattern 7t (dashed line racetrack patterns in FIG. 7) above a given land region, it can be used to compete for business with satellites in a geo-synchronized orbit. The advantages of SPSA include that these SPSAs are re-usable and closer to earth and each SPSA carries its own reusable launching system.

3. The technique discussed in section [A1/0] is used to bring rain to dry regions in the world. The Satellite Engines' (SEs') tasks are to warm the ocean surface a few miles off the southern California coast 7x. These tasks must also be timed with the local ocean wind direction, so that the high humidity air mass created by SEs over the ocean can be carried inland by the wind. To support the energy beam' direction guidance laws, a set of AAPs are defined and distributed over an ocean surface area 7x. The trajectories of these AAPs can follow the local water current, be timed in accordance with local wind directions, and avoid local cloud formations. Potential paying customers are southern California water authority 7y, etc. Potential non-paying customers are drought victims of Ethiopia 7z, etc.

[A6/5]: FIG. 7 illustrates some SWMS applications. Items in this figure are identified below:

7a Solar rays from the sun.

7b Solar rays reflected from SEs in lower orbit 7g to SEs in higher orbit 7h. SEs are too small to be shown in these orbits. Each 7b line in FIG. 7 represents solar rays from thousands of reflector panels belonging to many SEs.

7c Solar rays reflected from higher orbit 7h to earth or to SPSA 7p. SEs are too small to be shown in this figure. Each 7c line in FIG. 7 represents solar rays reflected from thousands of reflector panels belonging to many SEs. These solar rays can be aimed at many AAPs on earth or they may be focused on a single AAP at the center of an SPSA disk.

7d Nature generated whirlwinds.

7e Earth.

7g Lower orbit of a nonintersecting-noncoplanar orbital pair.

7h Higher orbit of a nonintersecting-noncoplanar orbital pair.

7i Directions of air mass motions induced by SWMS. This will create a whirlwind which can be used to cancel an existing whirlwind 7d.

7j Direction of air mass motions induced by SEWS. This will create a whirlwind which can be used to increase the strength of an existing whirlwind 7d.

7p Solar Powered Satellite Airplane (SPSA).

7r Local region to be warmed by solar energy.

7t SPSA flight pattern defined by GCS as focal point of thousands of reflecting solar rays. In most cases the SPSA flight path is the same as the common AAP trajectory defined by GCS.

7v Electricity generating stations: direct solar, wind or hydroelectric.

7w Greenhouse farms.

7x Ocean or other wet surfaces to be heated by concentrated solar energy beams. This is done to increase the air mass humidity above 7x.

7y Increased precipitation by SWMS in southern California.

7z Increased precipitation by SWMS in northern Ethiopia.

APPENDIX: ACRONYMS

AAP Adjusted Aim Point.

GCS Ground Control Station (see FIG. 1).

LOS Line-Of-Sight.

MMW Millimeter Wave.

RSD Remote Sensing Device (see FIG. 1).

SE Satellite Engine (See FIG. 2).

SPSA Solar Powered Satellite Airplane (see FIG. 4).

SWMS Satellite Weather Modification System (see FIG. 1).

[SWMS/#] Invention features relating to Satellite Weather Modification System (SWMS) designs (#=0,1, . . . ,5).

[SE/#] Invention features relating to Satellite Engines (SEs) designs (#=0,1,2, . . . ,6).

[OP/#) Invention features relating to SEs orbital operations (#=0,1,2, . . . ,10).

C/#] Invention features relating to SEs' energy beam direction Controls (#=0,1,2).

[RSD/#] Invention features relating to Remote Sensing Devices (RSDs) integration into the SWMS (#=0,1,2).

[GCS/#] Invention features relating to Ground Control Stations (GCSs) (SEs guidance) designs (#=0,1,2,3).

[F/#] Invention features relating to Frequency agile energy beams' frequency and intensity selections (#=0,1, . . . ,7).

[W#/#] Invention features relating to SWMS's basic Weather modification techniques. Four major features are: [W1/0], [W2/0], [W3/0] and [W4/0].

[W1/#] Invention features relating to modifying global weather conditions (#=0,1, . . . ,6).

[W2/#] Invention features relating to modifying local weather conditions (#0,1,2).

[W3/#] Invention features relating to moving an air mass in a vertical upward direction (#=0,1,2).

[W4/#] Invention features relating to modifying air mass velocity horizontal component (#=0,1,2).

[A#/#] Invention features relating to SWMS applications. Six major features are: [A1/0], [A2/0], [A3/0], [A4/0], [A5/0] and [A6/0].

A1/#] Invention features relating to increasing precipitation applications (#=0).

[A3/#] Invention features relating to creating whirlwinds (#=0,1,2,3).

[A4/#] Invention features relating to warming local regions (#=0)

[A5/#] Invention features relating to SPSA design and applications (#=0,1, . . . ,8).

[A6/#] Invention features relating to business ventures based on applications of SWMS and SWMS/SPSA services (#=0,1, . . . ,5).

I claim:

1. Apparatus comprising an airplane including propulsion means for powering the airplane in flight;

an energy storage device connected to the propulsion means;

at least one solar cell mounted on the airplane for supplying power to the propulsion means and for recharging the energy storage device;

at least one satellite in planetary orbit, the satellite being capable of reflecting solar radiation; and means for directing solar radiation reflected from the satellite onto the solar cell, thereby augmenting the solar radiation incident on the solar cell and increasing the power supplied by the cell to the propulsion means and to the energy storage device.

2. Apparatus according to claim 1 comprising a plurality of solar cells mounted on the airplane for supplying power to the propulsion means and for recharging the energy storage device, the directing means directing solar radiation reflected from the satellite onto each of the cells.

3. Apparatus according to claim 1 comprising a plurality of satellites in planetary orbit, each satellite being capable of reflecting solar radiation; and means for directing solar radiation reflected from each of the satellites onto the solar cell after one or more reflections between satellites.

4. Apparatus according to claim 1 comprising a plurality of solar cells mounted on the airplane for supplying power to the propulsion means and for recharging the energy storage device;

a plurality of satellites in planetary orbit, each satellite being capable of reflecting solar radiation; and means for directing the solar radiation reflected from each of the satellites onto the solar cells after one or more reflections between satellites.

5. A method of flight comprising providing an airplane including propulsion means for powering the airplane in flight and an energy storage device connected to the propulsion means;

mounting at least one solar cell on the airplane for supplying power to the propulsion means and recharging the energy storage device;

placing at least one satellite in planetary orbit, the satellite being capable of reflecting solar radiation; and controlling the satellite to reflect solar radiation onto the cell, thereby increasing the power the cell can supply to the propulsion means and to the energy storage device.

6. A method according to claim 5 comprising mounting a plurality of solar cells on the airplane for supplying power to the propulsion means and for recharging the energy storage device; and controlling the satellite to reflect solar radiation onto each of the cells after one or more reflections between satellites.

7. A method according to claim 5 comprising placing a plurality of satellites in planetary orbit, each satellite being capable of reflecting solar radiation; and directing solar radiation reflected from each of the satellites onto the cell after one or more reflections between satellites.

8. A method according to claim 5 comprising mounting a plurality of solar cells on the airplane for supplying power to the propulsion means and for recharging the energy storage device;

placing a plurality of satellites in planetary orbit, each satellite being capable of reflecting solar radiation; and directing solar radiation reflected from each of the satellites onto the cells after one or more reflections between satellites.

9. A method according to claim 5 comprising providing the airplane with a fuselage having a longitudinal axis;

providing the airplane with at least one panel;

mounting the solar cell on the panel; and tilting the panel about an axis parallel to the airplane's longitudinal axis to produce minimum drag force and zero lift force on each panel.

10. A method according to claim 9 comprising providing the airplane with a plurality of panels;

mounting a solar cell on each of the panels; and providing for tilting of each of the panels about respective axes each parallel to the airplane's longitudinal axis.

11. A method according to claim 10 comprising placing a plurality of satellites in planetary orbit each capable of reflecting solar radiation;

controlling the airplane to fly in loop patterns indefinitely above a designated geographical area; and tilting the panels to minimize the angle of incidence of the solar radiation on the solar cell and maximize the number of satellites that can reflect solar radiation onto the cells and the exposure of the cells to solar radiation.

12. A method according to claim 5 comprising mounting means on the satellite for transmitting energy to the airplane in a form other than solar radiation.

13. A method according to claim 12 comprising mounting means on the airplane for receiving energy from the satellite in a form other than solar radiation.

14. A method according to claim 5 comprising mounting means on the satellite for transmitting microwave energy to the airplane.

15. A method according to claim 14 comprising mounting means on the airplane for receiving microwave energy from the satellite.

* * * * *